United States Patent
Gautam et al.

(10) Patent No.: US 10,893,139 B1
(45) Date of Patent: Jan. 12, 2021

(54) PROCESSING INTERACTION REQUESTS WITH USER SPECIFIC DATA ON A SHARED DEVICE

(71) Applicant: Facebook, Inc., Menlo Park, CA (US)

(72) Inventors: Nikhil Gautam, Santa Clara, CA (US); Navid Mansourian, Emerald Hills, CA (US); Justin David Stahl, San Francisco, CA (US); John McCarthy, Dublin, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/601,538

(22) Filed: Oct. 14, 2019

(51) Int. Cl.
   *H04M 3/42* (2006.01)
(52) U.S. Cl.
   CPC ... *H04M 3/42051* (2013.01); *H04M 3/42068* (2013.01); *H04M 3/42382* (2013.01)
(58) Field of Classification Search
   CPC ......... H04M 3/42051; H04M 3/42068; H04M 3/42382
   USPC .................................................. 379/201.02
   See application file for complete search history.

(56) References Cited

U.S. PATENT DOCUMENTS

| | | | |
|---|---|---|---|
| 9,552,431 B2 * | 1/2017 | Nassar | H04L 63/08 |
| 10,148,666 B2 * | 12/2018 | Nassar | H04L 63/08 |
| 10,455,275 B2 * | 10/2019 | Connelly | H04N 21/4755 |
| 2010/0005520 A1 * | 1/2010 | Abbot | G06Q 10/10 726/6 |
| 2011/0026704 A1 * | 2/2011 | Connelly | H04L 67/306 379/219 |
| 2011/0202956 A1 * | 8/2011 | Connelly | H04N 21/4755 725/38 |
| 2017/0126695 A1 * | 5/2017 | Nassar | H04L 63/101 |
| 2018/0309801 A1 * | 10/2018 | Rathod | H04L 67/141 |
| 2019/0068613 A1 * | 2/2019 | Nassar | G06F 16/954 |
| 2020/0059690 A1 * | 2/2020 | Connelly | H04N 21/433 |

* cited by examiner

*Primary Examiner* — Khai N. Nguyen
(74) *Attorney, Agent, or Firm* — Fenwick & West LLP

(57) ABSTRACT

A shared communication system associates a plurality of owner profiles with the device and processes user interaction requests based on information included in the owner profiles. The communication system classifies incoming requests based on whether the results of a request should be personal to one user, shared among several users, or generic to all users, and processes requests according to the classification. In one embodiment, the user request is targeted at establishing a video call session between a user of the communication system and one or more other target recipient users of a communications system. The communication system determines which user to associate with the outgoing video call based on which user has the target recipient in an associated contacts list.

20 Claims, 4 Drawing Sheets

US 10,893,139 B1

PROCESSING INTERACTION REQUESTS WITH USER SPECIFIC DATA ON A SHARED DEVICE

BACKGROUND

This disclosure relates generally to interactions with a device shared by several users, and more particularly to customizing the results of requests on the shared device based on user data stored in owner profiles.

Devices such as in-home smart assistants, phone systems, or video conferencing systems are often used by multiple different individuals. These shared devices may host and display content relating to individual user preferences, interests, friends, and other provided personal data. However, a challenge exists in enabling different users to take advantage of personalized features in an intelligent way.

SUMMARY

A client device associates a plurality of owner profiles on a network enabled device with each of a plurality of device users and processes user requests based on information included in the owner profiles. Following the creation of one or more owner profiles, the client device receives requests to perform actions resulting from user interactions with the device. For each received request, the device classifies the request as having one of several types, including a shared request, a personal request, or a generic request.

If a received request is classified with the personal request type, the device compares profile data in each of the plurality of owner profiles with information in the first request. From the comparison, a best matching owner profile is determined and an action is performed using profile data from the matching owner profile. In some embodiments, the request identifies a requesting owner and the action is performed using profile data from only the requesting owner.

If a received request is classified with the generic request type, the device performs an action independently of profile data of any of the plurality of owner profiles.

If a received request is classified with the shared request type, the device identifies a plurality of owners associated with the request. The combined profile data from the plurality of owners is used to generate an output response to the request.

In some embodiments, the device receives a request to initiate a communication to a target recipient. The device compares the target recipient to a contacts lists included in each of the plurality of owner profiles. Upon detecting that the target recipient matches a contact in the contacts list of a particular owner, the device initiates an outgoing communication to the target recipient that specifies the owner as a source of the outgoing communication. In some cases, the target recipient is identified in the contacts lists of multiple owners, and the device initiates an outgoing communication to the target recipient that specifies the last active user of the device as the source of the outgoing communication.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
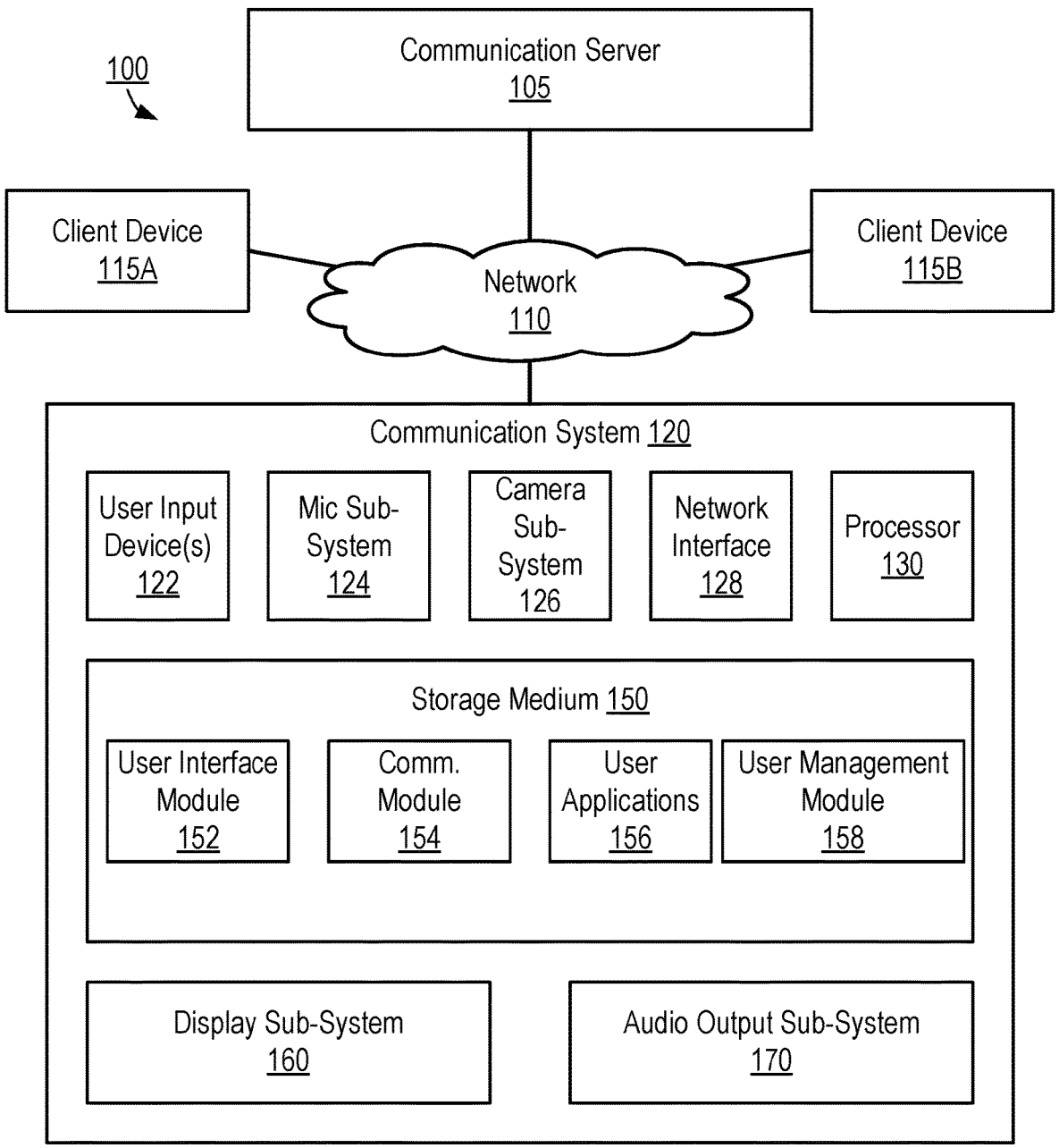
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 120 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output subsystem 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 120 may output audio in multiple channels to generate beamformed audio signals that give the listener a sense of directionality associated with the audio. For example, the audio output subsystem may generate audio output as a stereo audio output or a multi-channel audio output such as 2.1, 3.1, 5.1, 7.1, or other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, user management module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications, and user management module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The user management module 158 manages owner profiles and customizes operation of the communication system 120 for certain types of requests based on the owner profile data. Particularly, the user management module 158 stores data in owner profiles associated with users of the communication system 120 and provides owner profile data to other components of the communication system 120. For example, the user management module may create, process, or provide owner profile data based on an interaction with the user interface module 152, communication module 154, or any of user applications 156. In response to certain types of requested actions, the user management module 158 may detect one or more owners associated with certain types of requested actions and cause the action to be carried out based on the owner profile information of the detected owner. In an alternative embodiment, all or a portion of the functions of the user management module 158 may execute on the communication server 105 instead of on the communication system 120.

Figure 2:
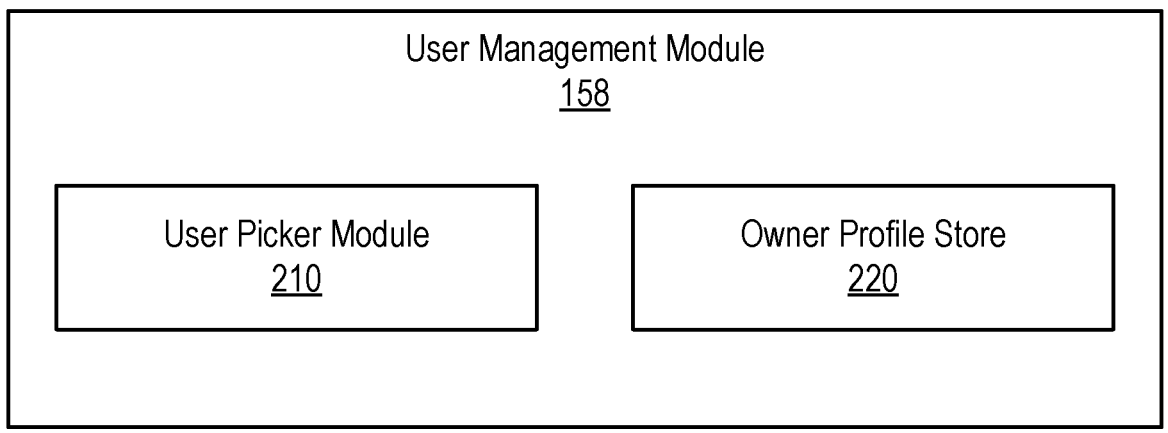
FIG. 2 is a block diagram of an example architecture for a user management module as depicted in the system of FIG. 1, according to an embodiment.

FIG. 2 illustrates an example embodiment of a user management module 158. In an embodiment, the user management module comprises a user picker module 210 and a user profile store 220. In alternative embodiments, the user management module 158 may include different or additional components.

The user picker module 210 selects owner profiles stored in the user profile store 220 and provides the selected owner profiles to other components of communication system 120. Upon receiving an interaction request from communication system 120, user picker module 210 identifies a type of the interaction request and selects any user profiles relevant to the interaction request. For example, the user picker module 210 may select the owner profile of a currently active user (identified by a log in interaction or other manual association of a user with a request) to process an interaction request. As another example, the user picker module 210 may select one or more owner profiles based on the type of interaction request and/or information included in the request. In some cases, the user picker module 210 may intelligently infer the identity of one or more owners associated with the request without the owner identify being explicitly provided in the request. In yet other request types (e.g., generic requests), the user picker module 210 may determine that owner profile data is not utilized to process the request, and in this case the user picker module 210 does not select any owner profiles. The user picker module 210 may interface with user interface module 152, communication module 154, or user applications 156 based on an interaction request received by communication system 120 and indicate which owner profiles are relevant to process the request. The user picker module 210 also provides the data from one or more determined owner profiles to the other components of communication system 120 so that data from the profiles can be used in executing an action corresponding to the request. In some embodiments, the user picker module 210 processes data included in selected owner profiles and provides the processed data to other components of communication system 120.

The user profile store 220 stores owner profiles associated with users of the communication system 120 in a database. The database may be in any format, such as a relational database or a noSQL database. Each owner profile includes fields representing information corresponding to the user associated with the owner profile. In various embodiments, the owner profile fields include a unique identifier of an associated user, data describing the user's preferences and interests, and user provided data such as calendar or contact information. Additionally, owner profile information may include profile data from one or more social network accounts associated with the owner. In one embodiment, the contact information is represented in the database as a contacts list, where each contact corresponds to a plurality of fields stored in the database. For example, the fields of each contact may include the contact's name, phone number, email address, or an identifier associated with the communication server 105. In some embodiments, a user creates an owner profile on communication system 120 through user interface module 155. In other embodiments, communication system 120 automatically creates owner profiles by recognizing when a new user is interacting with the device. In the same or different embodiments, communication system 120 adds additional data to an existing owner profile as an associated user interacts with the device.

Determining Request Type and Performing Corresponding Action

Figure 3:
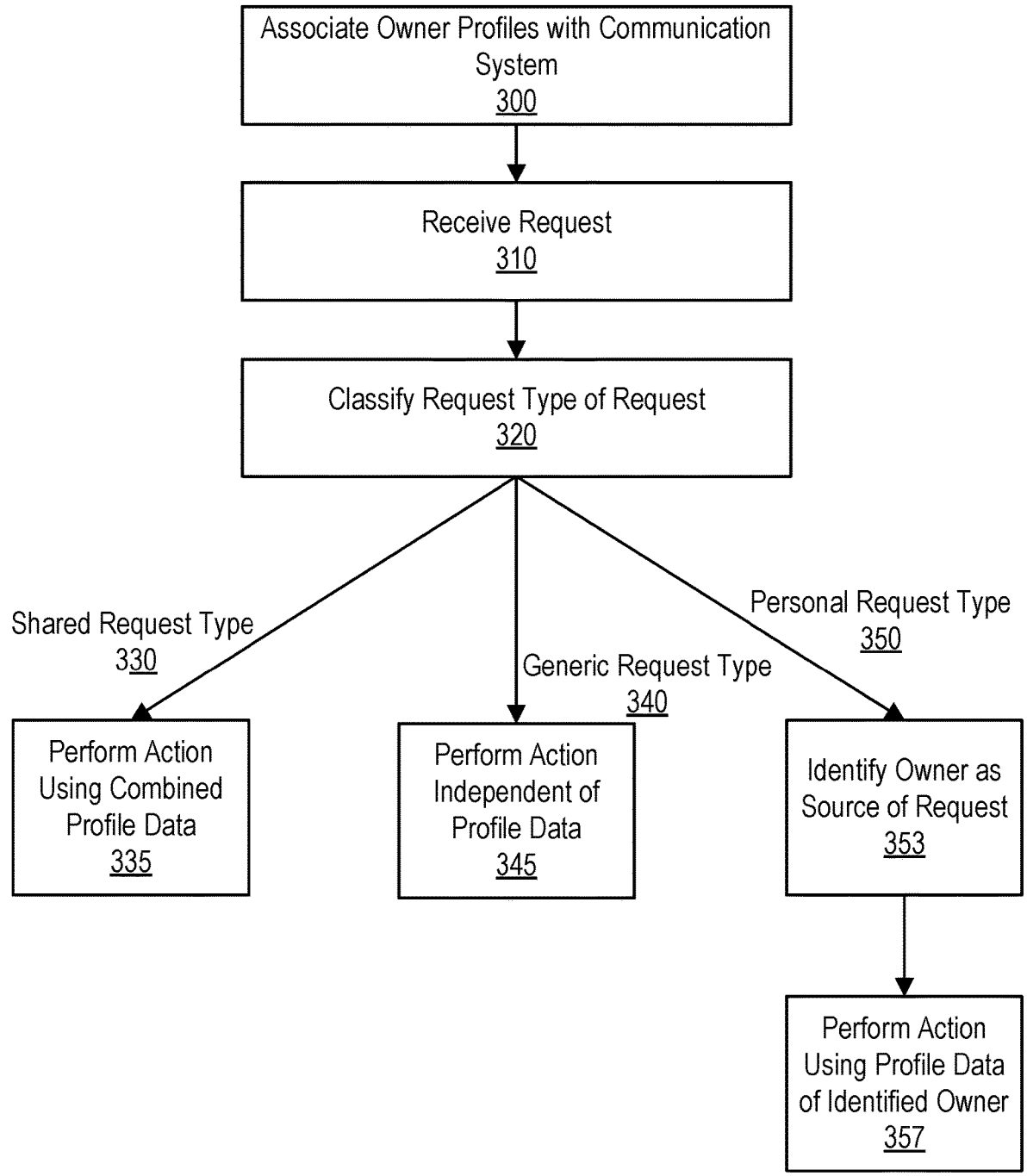
FIG. 3 is a flow diagram of a method for classifying a user request on a client device and executing a corresponding action, in accordance with an embodiment.

FIG. 3 is a flow diagram of a method for classifying a user request on the communication system 120 and executing a corresponding action, in accordance with an embodiment. A user request may be directly initiated by a user (e.g. initiating a call), or indirectly initiated by a user (e.g. selecting content for display on a user interface being interacted with by the user). For some requests the communication system 120 performs actions customized to one or more users, such as displaying a list of the contacts included in a contacts list associated with the user. For other requests, the communication system 120 performs the same actions regardless of which user requests them, such as displaying the current time. The method performed by the communication system 120 described below classifies and executes requests based on the required customization respective to one or more users.

The communication system 120 associates 300 an owner profile with the device for each of a plurality of users stored in the owner profile store 220. At some time after owner profiles are stored in the owner profile store 220, the communication system 120 receives 310 a request to perform an action. Upon receiving the request, the communication system 120 classifies 320 the request as one of a plurality of request types. For example, the plurality of types may include a shared request type 330, a generic request type 340, and a personal request type 350. In other embodiments, the request type is based on specific information included in the request and/or a specific state of the communication system 120. For example, if a specific owner is manually logged into the communication system 120, the request may automatically be classified as a personal request specific to that owner. Alternatively, if no owner is manually logged in, the request may be classified as a personal request specific to that owner if there is information in the request suggesting that the request should be applied to only a single owner. In one embodiment, the communication system 120 includes a lookup table which specifies the request type associated with different requests that can be implemented by the communication system 120. In this case, a received request is classified by looking up the entry in the lookup table associated with the received request and identifying the request type. In another embodiment, the request type is included in metadata included with each request.

If the request is classified as a shared request type 330, the communication system 120 performs 335 the action corresponding to the request using data from two or more selected owner profiles. The selected owner profiles may include all available owner profiles or a subset of relevant owner profiles selected by the user picker module 210. For example, the request may be directed at displaying a calendar with upcoming events for a set of users. The communication system 120 may obtain calendar data associated with each of the owner profiles associated with the communication system 120 and generate a combined calendar display that displays all of the calendar data. As another example, the request may be directed at bringing up a news feed customized to the related interests of a set of users of the communication system 120. In this case, the communication system 120 generates a combined news feed display that displays news related to interests of each of the set of users. As still another example, the request may be directed at querying the calendar data of a set of users in order to identify a date that is relevant to each user in the set, such as a date where each user is free.

If the request is classified with a generic request type 340, the communication system 120 performs 345 the action corresponding to the request independently from any owner profile data. Generic requests do not process data included in any owner profiles and produce results which are irrespective to which user made the request. For example, the request may be directed at querying the current weather report or the time of day. As another example, the request may be directed at querying a specific piece of content or a resource, such as a website or a news article. If the request is classified with a personal request type 250, the user picker module 210 identifies 253 an owner profile associated with one of the plurality of users as the source of the request. In some cases, the user picker module 210 may directly identify a user associated with the request by determining a specific user logged in to the communication system 120. As another example, a request may specify a specific user to be associated with request (e.g. a user states their name when making a voice request). In still another example, each of user input devices 122 may be associated with a particular user (e.g. a user's mobile phone). In this case, when a request is submitted through one of the user input devices 122 user picker module may identify the user associated with the input device as the user associated with the request. In other cases, the communication system 120 may determine a user to associate with the request by processing user voice data, facial imaging data, or other biometric data to identify which user is making the request. In the case where there is only one owner profile in the owner profile store 220, the user picker module 210 may automatically select the one owner profile to associate with the request.

In some embodiments the user picker module 210 identifies a source owner profile by comparing metadata included in the request to each of the owner profiles stored on the communication system 120. In this case, the user picker module 210 selects the owner profile containing information that most closely matches the information included in the request. Request metadata may include the source of a request, information needed to execute the request, when the request was received, how the request was received, and any other information that may be relevant to the communication system 120 when processing the request. The request may also specify information that is specific to one or more user profiles. For example, the request may be targeted at querying calendar events on a specific date. In this case, the user picker module 210 may examine the calendar data stored in each owner profile to determine if there are one or more owner profiles with a calendar event on the requested date, and select a particular owner profile based on the result. As another example, the request may be targeted at communicating with a target recipient. The user picker module 210 may search the contacts list of each of the owners to identify the owner most likely to be associated with the request (e.g., the owner that has the target recipient in his or her contacts list) and personalize the request to that owner such that the call is made with the selected owner as the call source.

The communication system 120 performs 357 the action corresponding to the request using data from the owner profile of the identified owner. In response to personal requests, the communication system 120 generates an output customized to the user associated with the owner profile. For example, the request may be directed at adding an event to the user's personal calendar data and add the event to the calendar data stored in the user's owner profile. As another example, the request may be directed at creating private communication (e.g. an email) between the user and a target recipient, and generate the outgoing private communication with an indication that the owner is the sender.

Identifying Owner for Outgoing Communication Request Using Contacts Lists

Figure 4:
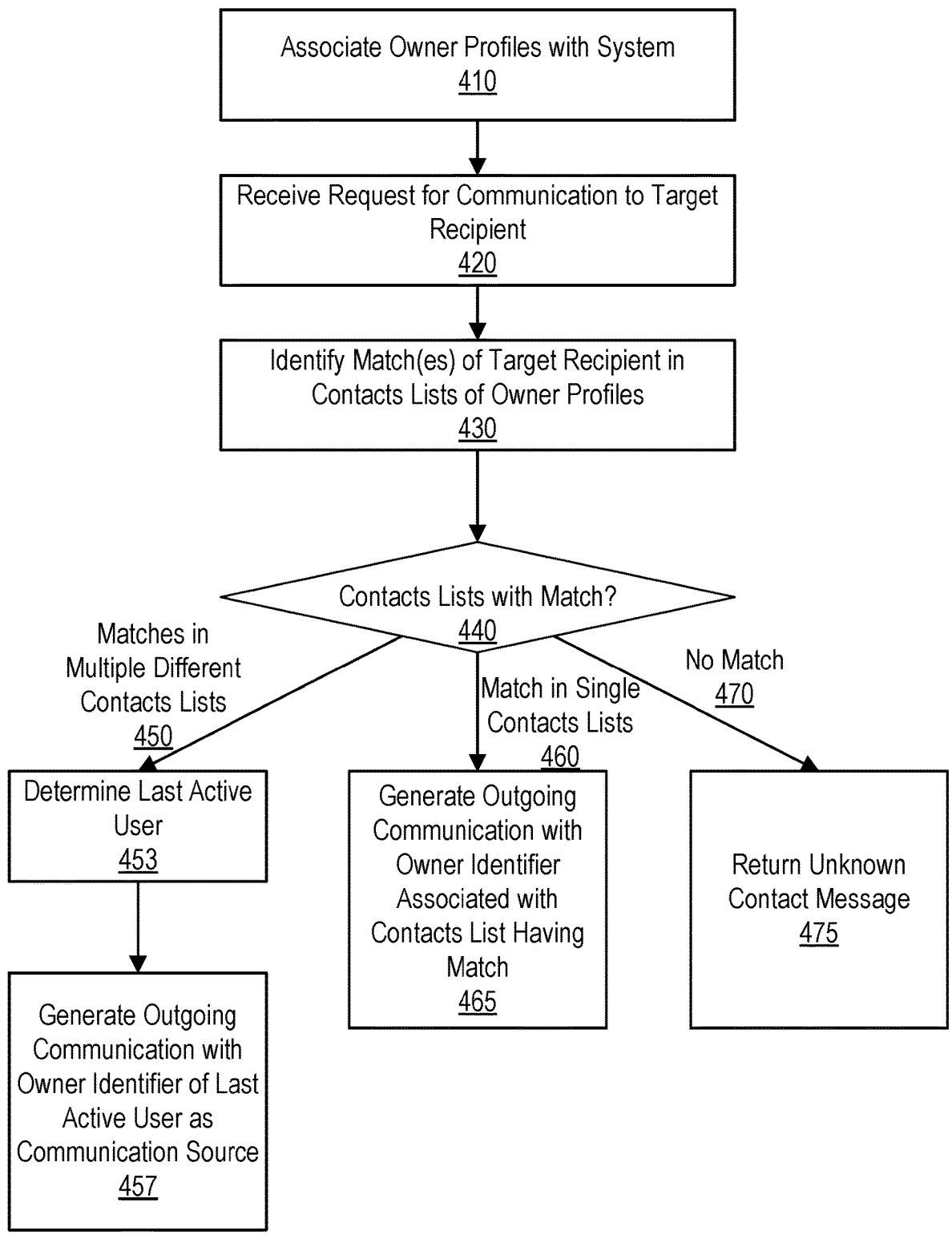
FIG. 4 is a flow diagram of a method for selecting an owner profile to associate with a communication request on a client device using contacts lists, in accordance with an embodiment.

FIG. 4 is a flow diagram of a method for selecting an owner profile to associate with a communication request on a client device using contacts lists, in accordance with an embodiment. In the method described below, the communication system 120 indirectly determines who is making the communication request. For example, the communication request may be made by a user when no owner profile is logged in on the communication system 120. As another example, the request may be a voice request input by a user through the mic sub system 124. In this case, even if an identified user is interacting with the communication system 120 when the voice request is made, the communication system 120 determines whether the source of the voice request is the identified user or another user in the general proximity of the device. In one or more embodiments, the communication request is classified as a personal request and the method in FIG. 3 is the process followed by the user picker module 210 to identify a source owner profile, as described in the previous section.

Similar to what is described for FIG. 2 above, the communication system 120 associates 410 an owner profile with the device for each of a plurality of users stored in the owner profile store 220. At some time after owner profiles are stored in the owner profile store 220, the communication system 120 receives 320 a request to communicate with a target recipient via the communication server 105 submitted by one of the plurality of users with an owner profile. In one or more embodiments, the outgoing communication is a message, such as an email, a text message, an audio recording, an image, or other multimedia message. In other embodiments, the outgoing communication is an attempt to establish a live connection with the target recipient through the communication server 105, such as a voice call or a video call. In this case, live communication is facilitated through the communication system 120 by one or more of the display sub-system 160, camera sub-system 126, audio output sub-system 179, or mic sub-system 124. The communication request is received by the communication system 120 through a command interface facilitated through one or more components of the communication system 120. For example, the communication request may be submitted by a user through user interface module 152. As another example, the communication request may be submitted as a voice command through the mic sub-system 124. In still another example, users submit communication requests through user input devices 122.

Upon receiving the request, the user picker module 210 identifies 430 the contacts lists 340 with a contact matching the target recipient through a comparison with the contacts list of each owner profile. If matches of the target recipient are found in multiple contacts lists 450, the user picker module 210 determines 453 the last active user of the device. The communication module 154 then generates 457 an outgoing communication to the target recipient using the owner identifier of the last active user as the communication source. In one embodiment, the last active user is the most recent user to submit a request on the communication system 120 where the owner profile was identified at the time of the request. For example, the last active user may be the most recent user to log in to the device, to send a communication by selecting a contact, to use one of the user applications 156, or perform any other interaction with the communication system 120 as an identified owner. In the same or different embodiment, the last active user is the most recent user to submit a request on the communication system 120 where the owner profile was identified before or after processing the request. For example, a user may submit a request classified as a personal request where the user picker module 210 identified an owner profile, as described in section 2.

If a match of the target recipient is found in a single contacts list 460, the communication module 154 generates 465 an outgoing communication to the target recipient using the owner identifier associated with the contacts list.

The generated outgoing communication is sent by the communication module 154 to the target recipient through the communication server 105.

If no match of the target recipient is found in any contacts list 470, the communication system 120 returns 475 an unknown contact message to the requesting user. In one embodiment, the message is conveyed by the user interface module 152 on display 120. In another embodiment, the message is conveyed by a computer-generated voice through the mic sub-system 124.

Although the embodiment described above is specific to a communication request, similar methods apply in other various embodiments where requests are made by unidentified users. For example, a user may submit a voice request querying information about an upcoming calendar event. In one embodiment, the communication system 120 processes this request by comparing information in the request about the event to the calendar data stored in each owner profile. If the communication system 120 finds a matching event in the data of a single owner profile, the requested information in the associated owner profile is reported to the requesting user. If the communication system 120 finds matching events in the data of multiple owner profiles, the requested information in the owner profile associated with the last active user is reported to the requesting user.

Similar methods to what are described above may also be used when a request is not initiated through a user interaction with the communication system 120. For example, communication system 120 may receive an incoming communication request (e.g. incoming voice or video call) identifying a sender through communication server 105 and compare owner profile data across several profiles to determine an owner profile of an intended recipient. In one embodiment, each owner profile includes a preferred audio alert (e.g. call ring, notification chime, etc.) when a communication is received by communication system 120 directed at the user associated with the owner profile. In this case, the user picker module 210 may use the sender identifier to follow the same process as described above when receiving an incoming communication to identify an owner profile of the intended recipient and play the audio alert included in the owner profile.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   associating a plurality of owner profiles with a computing device;
   receiving, by the computing device, a first request for a first action to be performed by the computing device;
   determining, based on the first action, a first request type of the first request from a set of request types stored by the computing device, the set of request types including:
   a generic request type associated with actions independent of profile data of the plurality of owner profiles;
   a personal request type associated with actions using profile data of a single owner profile of the plurality of owner profiles; and
   a shared request type associated with actions using profile data of multiple owner profiles of the plurality of owner profiles;
   responsive to determining the first request type is of the personal request type, comparing profile data of each of the plurality of owner profiles with information in the first request;
   determining a best matching owner profile to the information in the first request; and
   performing the first action using the profile data of the best matching owner profile.

2. The method of claim 1, further comprising:
   receiving, by the computing device, a second request for a second action to be performed by the computing device, the second request identifying a requesting owner;
   determining, based on the second action, a second request type of the second request;

responsive to determining the second request type is of the personal request type, performing the second action using profile data of an owner profile of the plurality of owner profiles associated with the requesting owner.

3. The method of claim 1, further comprising:
receiving, by the computing device, a second request for a second action to be performed by the computing device;
determining a second request type of the second request;
responsive to determining the second request type is of the generic request type, performing the second action independently of profile data of the plurality of owner profiles.

4. The method of claim 1, further comprising:
receiving, by the computing device, a second request for a second action to be performed by the computing device;
determining a second request type of the second request;
responsive to determining the second request type is of the shared request type, identifying a plurality of owner profiles associated with the second request; and
combining profile data of the identified plurality of owner profiles to generate an output in response to the second request.

5. A non-transitory computer-readable storage medium comprising computer program instructions that when executed by a computer processor of an online system causes the processor to perform steps comprising:
associating a plurality of owner profiles with a computing device;
receiving, by the computing device, a first request for a first action to be performed by the computing device;
determining, based on the first action, a first request type of the first request from a set of request types stored by the computing device, the set of request types including:
  a generic request type associated with actions independent of profile data of the plurality of owner profiles;
  a personal request type associated with actions using profile data of a single owner profile of the plurality of owner profiles; and
  a shared request type associated with actions using profile data of multiple owner profiles of the plurality of owner profiles;
responsive to determining the first request type is of the personal request type, comparing profile data of each of the plurality of owner profiles with information in the first request;
determining a best matching owner profile to the information in the first request; and
performing the first action using the profile data of the best matching owner profile.

6. The non-transitory computer-readable storage medium of claim 5, further comprising:
receiving, by the computing device, a second request for a second action to be performed by the computing device, the second request identifying a requesting owner;
determining, based on the second action, a second request type of the second request as the personal request type;
responsive to determining the second request type is of the personal request type, performing the second action using profile data of an owner profile of the plurality of owner profiles associated with the requesting owner.

7. The non-transitory computer-readable storage medium of claim 5, further comprising:
receiving, by the computing device, a second request for a second action to be performed by the computing device;
determining a second request type of the second request;
responsive to determining the second request type is of the generic request type, performing the second action independently of profile data of the plurality of owner profiles.

8. The method of non-transitory computer-readable storage medium of claim 5, further comprising:
receiving, by the computing device, a second request for a second action to be performed by the computing device;
determining a second request type of the second request;
responsive to determining the second request type is of the request type, identifying a plurality of owner profiles associated with the second request; and
combining profile data of the identified plurality of owner profiles to generate an output in response to the second request.

9. A method comprising:
associating a plurality of owner profiles with a communication device, the plurality of owner profiles including a first owner profile associated with a first owner identifier and a first list of contacts and a second owner profile associated with a second owner identifier and a second list of contacts;
receiving, by the communication device, a first request to initiate a first communication with a first recipient communication device associated with a first target recipient;
comparing the first target recipient to the first list of contacts and the second list of contacts;
detecting that the first target recipient matches a contact in the first list of contacts and does not match any contacts in the second list of contacts;
responsive to the detecting, initiating a first outgoing communication from the communication device to the first recipient communication device, the first outgoing communication specifying the first owner identifier as a source of the first outgoing communication.

10. The method of claim 9, further comprising:
receiving, by the communication device, a second request to initiate a second communication with a second recipient communication device associated with a second target recipient;
comparing the second target recipient to the first list of contacts and the second list of contacts;
detecting that the second target recipient matches a contact in both the first list of contacts and the second list of contacts;
responsive to the detecting, identifying a last active user of the communication device between the first owner and the second owner; and
initiating a second outgoing communication from the communication device to the second recipient device, the second outgoing communication specifying an owner identifier of the last active user as a source of the second outgoing communication.

11. The method of claim 9, wherein receiving the first request is via a first command interface, the method further comprising:
receiving, by the communication device, a second request to initiate a second communication with a second recipient communication device associated with a second target recipient, the second request via a second command interface;

identifying an active user logged into the second command interface; and initiating a second outgoing communication from the communication device to the second recipient device, the second outgoing communication specifying an owner identifier of the last active user as a source of the second outgoing communication.

12. The method of claim 9, further comprising:

storing an incoming call ring setting associated with the first owner profile and a second incoming call ring setting associated with the second owner profile;

receiving a first incoming call specifying the first owner identifier;

generating a first ring according to the first incoming call ring setting associated with the first owner profile.

13. The method of claim 12, further comprising:

receiving a second incoming call specifying the second owner identifier;

generating a second ring according to the second incoming call ring setting associated with the second owner profile.

14. The method of claim 9, wherein the communication comprises one of: a voice call, a video call, an email, a text message, and a multimedia message.

15. A non-transitory computer-readable storage medium comprising computer program instructions that when executed by a computer processor of an online system causes the processor to perform steps comprising:

associating a plurality of owner profiles with a communication device, the plurality of owner profiles including a first owner profile associated with a first owner identifier and a first list of contacts and a second owner profile associated with a second owner identifier and a second list of contacts;

receiving, by the communication device, a first request to initiate a first communication with a first recipient communication device associated with a first target recipient;

comparing the first target recipient to the first list of contacts and the second list of contacts;

detecting that the first target recipient matches a contact in the first list of contacts and does not match any contacts in the second list of contacts;

responsive to the detecting, initiating a first outgoing communication from the communication device to the first recipient communication device, the first outgoing communication specifying the first owner identifier as a source of the first outgoing communication.

16. The non-transitory computer-readable storage medium of claim 15, further comprising:

receiving, by the communication device, a second request to initiate a second communication with a second recipient communication device associated with a second target recipient;

comparing the second target recipient to the first list of contacts and the second list of contacts;

detecting that the second target recipient matches a contact in both the first list of contacts and the second list of contacts;

responsive to the detecting, identifying a last active user of the communication device between the first owner and the second owner; and initiating a second outgoing communication from the communication device to the second recipient device, the second outgoing communication specifying an owner identifier of the last active user as a source of the second outgoing communication.

17. The non-transitory computer-readable storage medium of claim 15, wherein receiving the first request is via a first command interface, the method further comprising:

receiving, by the communication device, a second request to initiate a second communication with a second recipient communication device associated with a second target recipient, the second request via a second command interface;

identifying an active user logged into the second command interface; and initiating a second outgoing communication from the communication device to the second recipient device, the second outgoing communication specifying an owner identifier of the last active user as a source of the second outgoing communication.

18. The non-transitory computer-readable storage medium of claim 15, further comprising:

storing an incoming call ring setting associated with the first owner profile and a second incoming call ring setting associated with the second owner profile;

receiving a first incoming call specifying the first owner identifier;

generating a first ring according to the first incoming call ring setting associated with the first owner profile.

19. The non-transitory computer-readable storage medium of claim 18, further comprising:

receiving a second incoming call specifying the second owner identifier;

generating a second ring according to the second incoming call ring setting associated with the second owner profile.

20. The non-transitory computer-readable storage medium of claim 15, wherein the communication comprises one of: a voice call, a video call, an email, a text message, and a multimedia message.

* * * * *

UNITED STATES PATENT AND TRADEMARK OFFICE
CERTIFICATE OF CORRECTION

Page 1 of 1

PATENT NO. : 10,893,139 B1
APPLICATION NO. : 16/601538
DATED : January 12, 2021
INVENTOR(S) : Gautam et al.

It is certified that error appears in the above-identified patent and that said Letters Patent is hereby corrected as shown below:

On the Title Page

Item (58), in Column 1, under "Field of Classification Search", Line 3, after "379/201.02" insert -- , 201.01 --.

Item (57), in Column 2, under "Abstract", Line 11, delete "communications" and insert -- communication --, therefor.

In the Claims

In Column 13, in Claim 6, Line 61, delete "request as the personal request type;" and insert -- request; --, therefor.

In Column 14, in Claim 8, Line 9, delete "The method of" and insert -- The --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*